Patented Dec. 11, 1945

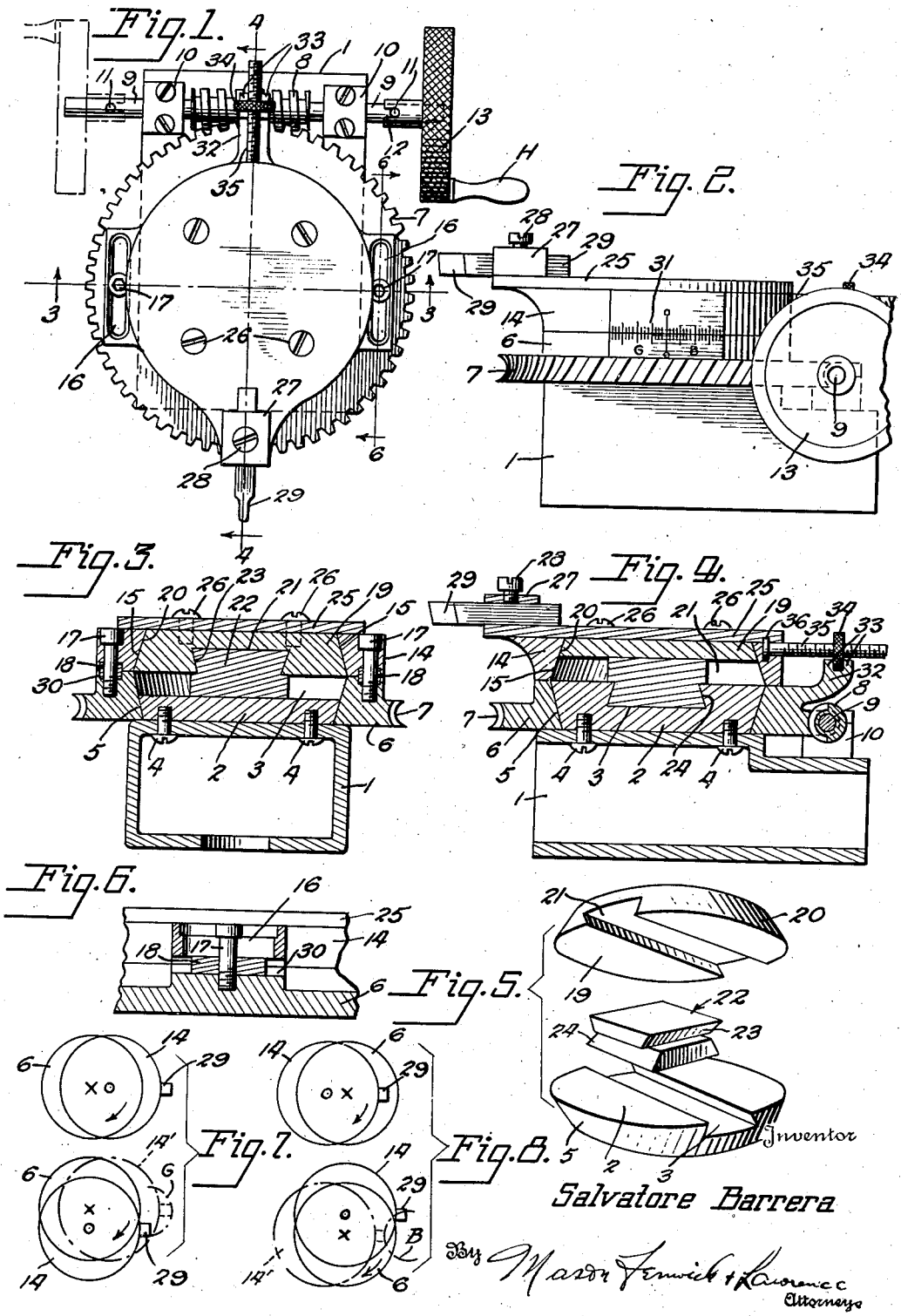

2,390,914

UNITED STATES PATENT OFFICE 2,390,914

RADII TOOL AND DRESSER

Salvatore Barrera, Brooklyn, N. Y.

Application June 20, 1944, Serial No. 541,203

6 Claims. (Cl. 82—11)

This invention relates to radii tool holders for machine tools such as lathes, planers and the like, and more particularly to a radii dresser.

An object of the present invention is to provide a radii dresser capable of adjustment with great refinement and precision.

A further object of the invention is to provide a tool of the character indicated of a construction providing great rigidity and stability for the tool proper.

A further object of the invention is to provide a tool of the character indicated of great simplicity, involving a very few parts and those of simple construction lending themselves to great efficiency and economy in both manufacture and maintenance.

A further object of the invention is to provide a tool of the character of unusual versatility, inasmuch as it lends itself to use for the cutting or dressing of both convex and concave surfaces by means of the very simple adjustment of its parts.

Further objects and advantages will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

Figure 1 is a plan view of the improved tool;

Figure 2 is a side elevation;

Figure 3 is a vertical transverse cross-section taken on line 3—3 of Figure 1;

Figure 4 is a vertical longitudinal cross-section taken on line 4—4 of Figure 1;

Figure 5 is an exploded perspective view illustrating the slidably adjustable parts and interlocking key member for providing the limited movement of the tool carrier to perpendicular directions only;

Figure 6 is a fragmentary vertical cross-section taken on line 6—6 of Figure 1; and Figures 7 and 8 are diagrammatic figures illustrating the movement of the tool in the opposite maximum positions of adjustment.

The gist of the present invention is the provision of a mechanical structure whereby a cutting tool can be so mounted with respect to a fixed base as to assure the restriction of its movement to two perpendicular directions in association with operation means adapted to transmit motion to the cutting tool and the parts upon which it is rigidly mounted in those two perpendicular directions in such varying proportions as to cause the said cutting tool to transcribe an arcuate orbit. Various mechanical devices may be utilized to produce the movement indicated and the structure illustrated on the drawing forming a part of this specification is believed to be a highly efficient embodiment of suitable mechanical means for carrying into effect the above indicated object.

Referring to the drawing, a standard base 1 is utilized of conventional structure adapted to be secured rigidly to the bed or tool carriage of the lathe, planer, or other machine tool with which the device is to be used, and upon the top face of this base member 1 is secured a circular disk 2 as by means of screws 4. The disk 2 is provided with a diametrically disposed slot 3 preferably of dovetail cross-section as herein illustrated and the peripheral edge 5 of the disk 2 is beveled in an outwardly and upwardly inclined direction.

Rotatably mounted upon the disk 2 is a ring 6 having its inner peripheral surface similarly beveled to seat on the beveled edge of the disk 2 and having its outer peripheral edge provided with worm gear teeth 7 adapted to be engaged by a worm 8 formed on a shaft 9 supported in bearings 10—10 mounted upon the base 1. The shaft 9 is provided adjacent each end with cross pins 11 adapted to engage a slotted sleeve 12 formed as a hub on the hand wheel 13 which may be provided if desired with a handle H by means of which the worm 8 can be rotated selectively from either side of the device.

Seated upon the upper face of the ring 6 is a second ring 14, the inner peripheral surface of which is beveled in an opposite direction to that of the ring 6 as at 15. The ring 14 is provided on opposite sides with parallel slots 16—16 through which extend screws 17—17 which are secured in the ring 6. To assure the utmost precision in the adjustment of the rings 6 and 14, the slots 16 may be enlarged adjacent the adjoining surfaces of the rings 6 and 14 as indicated at 30 to receive an elongated slide member 18 through which the screws 17 are passed.

Mounted within the ring 14 is a second disk 19 having a beveled circular peripheral edge 20 forming a bearing for the ring 14. The disk 19 is formed with a diametrically disposed slot 21 in its lower face, which slot is preferably as herein illustrated also of dovetail cross-section corresponding to the slot 3 in the fixed disk 2.

A key member 22 is provided having oppositely disposed dovetailed key portions 23, 24, which said dovetail key portions are arranged perpendicular with respect to each other.

Referring to Figure 5, it will be noted that the dovetail key portion 24 of the key member 22 is adapted to slidably seat in the dovetail slot 3 of the fixed disk 2, while the dovetail key portion 23 is adapted to slidably seat in the dovtail slot 21 of the sliding disk member 19 by reason of which connection it will be observed that while the first disk member 2 is held rigid by means of its fixed connection to the base 1 the upper disk 19 is slidable in perpendicular directions with respect to the disk 2, but is held in nonrotatable relationship to said disk.

The disk 19 has secured upon its upper face a plate 25 as by means of screws 26 and the plate 25 is formed with a tool holder lug 27 adapted to receive a cutting tool 29 which is held in fixed relationship to holder lug 27 as by set screw 28, the tool projecting beyond the rings 6 and 14 and also beyond the worm gear portion 7 formed on ring 6.

While the parts 19, 25 and 27 are herein described as separate elements, these three portions constitute in fact the tool holder proper and the term tool holder as used in the claims herein is intended to cover the parts 19, 25 and 27 or their equivalents, whether formed as separate portions secured together or as a unitary part.

To adjust ring 14 with respect to ring 6, ring 6 may be provided with an outwardly projecting lug 32 having upstanding spaced fingers 33 between which is positioned a thumb nut 34 threaded on a screw 35 having its head 36 rotatably secured in ring 14. Scales 31 can be marked upon adjacent portions of rings 6 and 14 to indicate the maximum adjustment of ring 14 to produce either a concave or convex orbit for tool 29.

The operation of the device is diagrammatically illustrated in Figures 7 and 8. Referring to Figure 7, the center marked $x$ indicates the center of rotation of the ring 6, which ring 6 being rotatably mounted on the fixed disk 2 always rotates on this center $x$. The center marked $o$ is the center of disk 19 and ring 14 in the maximum adjustment of ring 14 in the direction of the tool holder 27 or to the left as illustrated in Figure 2. With ring 14 adjusted to the maximum extent to the left as permitted by slots 16, rotation of ring 6 by means of worm 8 and handle H will cause the ring 14 to rotate as an eccentric and impart motion to the tool holder disk 19 (and its other associated parts 25 and 27) in perpendicular directions in different proportions successively to cause the tool 29 to transcribe an arcuate orbit shown in dotted lines at G or a groove. The radius of the groove G is exactly the same as the distance to which the center $o$ is shifted with respect to the center $x$. In Figure 8 is illustrated the movement of ring 14 with respect to disk 6 where the center $o$ of ring 14 is adjusted a maximum amount away from tool holder 27 or to the right in Figure 2, in which adjustment it will be noted that the tool 29 will transcribe an arcuate orbit B or a bead, the radius of which bead will conform exactly with the distance to which the point $o$ is adjusted with respect to the center $x$. Where the ring 14 is adjusted with respect to ring 6 so that the center $o$ coincides with the center $x$, the tool 29 will have no movement whatever, so that the capacity of a particular tool is determined by the adjustment permitted through slots 16.

As indicated at the beginning of this specification, the drawing herein illustrates a practical and efficient embodiment of the invention, but various mechanical expedients and modifications of structure will readily suggest themselves to those skilled in the art to produce the orbit or movement of the tool 29 within the scope of the present invention, as claimed.

Having thus described my invention, I claim:

1. Radii dresser comprising a base, a circular bearing member fixed with respect to the base, a rotatable member mounted to rotate with respect to the fixed circular bearing, a part slidable and adjustable with respect to the rotatable member on a plane transverse the axis of the rotatable member, said adjustable part formed with a circular bearing, a tool carrying part having a circular bearing connecting with the circular bearing of the adjustable part, the fixed circular bearing member and tool carrying member each provided on their confronting faces with perpendicularly disposed slots, and a key member formed with portions adapted to seat in each of said slots.

2. Radii dresser comprising a base, a circular bearing member fixed with respect to the base, a rotatable member mounted to rotate with respect to the fixed circular bearing, a part slidable and adjustable with respect to the rotatable member on a plane transverse the axis of the rotatable member, said adjustable part formed with a circular bearing, a tool carrying part having a circular bearing connecting with the circular bearing of the adjustable part, the fixed circular bearing member and tool carrying member each provided on their confronting faces with perpendicularly disposed slots, said slots intersecting at the center of the circular bearing member, and a key member formed with portions adapted to seat in each of said slots.

3. Radii dresser comprising a base, a part fixed with respect to the base having a peripheral circular bearing face, a ring rotatably mounted on said fixed part, means for rotating the ring with respect to the base, a second ring adjustably mounted on the first ring, a tool carrier having a circular peripheral bearing surface adapted to seat in said second ring and means connecting the base and tool carrier restricting the latter to movement in perpendicular directions only.

4. Radii dresser comprising a base, a disk having a beveled peripheral bearing face secured to the base, a ring having an internal beveled face adapted to seat on said disk and teeth on its outer face, a second ring having an oppositely beveled inner face, means for adjusting the second ring diametrically of the first, a tool carrier disk having a beveled peripheral face adapted to seat within the second ring, the fixed disk and tool carrier disk having dovetail grooves respectively on their adjacent faces, said grooves arranged perpendicularly, a key member having perpendicularly disposed dovetail parts adapted to seat in said dovetail grooves and a worm mounted on the base to engage and rotate the rings in unison as an eccentric.

5. Radii dresser comprising two rings superposed and adjustably connected to comprise an eccentric, a fixed circular base for one of said rings and a circular member embraced by the other of said rings, the confronting faces of said base and circular member formed with perpendicularly disposed slots, a key member having portions slidable in said slots respectively whereby the circular member is restricted to movement in perpendicular directions only, a tool carrier mounted on said circular member and means for rotating the ring members in unison.

6. Radii dresser comprising in combination a fixed member and a tool carrier, each of said members having a slideway, said members arranged with the slideway in one perpendicular to the slideway in the other, a key member having portions slidable in each of said slideways, ring members journaled upon the fixed member and tool carrier respectively with parallel axes, means for adjustably displacing the axes of said ring members in their plane of rotation, whereby said rings constitute an adjustable eccentric to modify the radius of the orbit transcribed by the tool carrier.

SALVATORE BARRERA.